Aug. 16, 1955   A. J. WINCHESTER, JR   2,715,702
MOTOR CONTROL SYSTEMS FOR TENSION CONTROL
Filed April 19, 1950   4 Sheets-Sheet 1

WITNESSES:
Robert C Baird
G. V. Giolma

INVENTOR
Amos J. Winchester, Jr.
BY
ATTORNEY

Aug. 16, 1955　　　A. J. WINCHESTER, JR　　　2,715,702
MOTOR CONTROL SYSTEMS FOR TENSION CONTROL
Filed April 19, 1950　　　　　　　　　　　4 Sheets-Sheet 2

WITNESSES:　　　　　　　　　　　INVENTOR
Robert C. Baird　　　　　　Amos J. Winchester, Jr.
F. V. Giolma　　　　　　　　BY
　　　　　　　　　　　　　　　M J Crawford
　　　　　　　　　　　　　　　　ATTORNEY INVENTOR
Amos J. Winchester, Jr.

United States Patent Office 2,715,702
Patented Aug. 16, 1955

2,715,702

MOTOR CONTROL SYSTEMS FOR TENSION CONTROL

Amos J. Winchester, Jr., Lockport, N. Y., assignor to Westinghouse Electric Corporation, East Pittsburgh, Pa., a corporation of Pennsylvania Application August 19, 1950, Serial No. 180,405

11 Claims. (Cl. 318—7)

My invention relates generally to tension control systems, and it has reference in particular to a tension control system such as may be used to control the tension of a strip in a strip mill or the like.

Generally stated it is an object of my invention to provide a tension control system that is simple and inexpensive to manufacture, and is reliable and effective in operation.

More specifically it is an object of my invention to provide in a tension control system for selectively controlling the tension by means of current regulation or tension regulation.

Another object of my invention is to provide in a tension control system for utilizing tension devices having upper and lower tension rolls driven by separate motors having a common load division control means.

Yet another object of my invention is to provide in a tension control system for utilizing a speed limiting regulating generator which limits the speed of the tension device to a predetermined relation with the speed of the mill should the strip break.

It is also an object of my invention to provide in a tension control system means for effecting inertia compensation in accordance with the rate of change of the speed of the mill.

It is an important object of my invention to provide in a tension control system for a strip mill means for matching the inertia compensation for tension devices associated with the different stands of a mill with the speeds of their associated stands.

Another important object of my invention is to provide in a tension control system for a temper pass mill means for changing the degree of inertia compensation on the entry and delivery sides of the mill during acceleration and deceleration of the mill.

It is a further object of my invention to provide, in a tension control system for a strip mill means for utilizing a booster generator to vary the voltage applied to the driving motor of one stand relative to the other and to provide IR drop compensation in the lower speed range of the mill only.

Still another object of my invention is to provide, in a tension control system means for compensating for the time constants of the electrical equipment, so as to effect changes in the speed of the mill more rapidly.

Other objects will in part be obvious, and will in part be explained hereinafter.

In practicing my invention in accordance with one of its embodiments, the motors of the two mill stands of a temper pass mill are supplied with electrical energy from a main generator, the output voltage of which is controlled by a regulating generator having a pattern field winding energized through a motor operated master rheostat. Ahead of the first or No. 1 stand and following the second or No. 2 stand, entry and delivery tension devices are located, each having upper and lower rolls about which the strip passes. The rolls are driven by separate motors supplied from individual generators under the control of regulating generators having a common load balance potentiometer in their pattern field circuits for simultaneously changing the load distribution between the roll motors. Tensiometers are used between the tension devices and the mill stands as well as between the two stands of the mill. The regulating generators of the tension devices are transferred from current regulation to tension regulation by means of a transfer switch controlling the connections of their pattern field windings. The tensiometer between the mill stands operates on a booster generator of the first mill stand to regulate the tension of the strip between the stands. A speed limiting regulating generator on the delivery end of the mill prevents the delivery tension device from exceeding a predetermined speed relation relative to the speed of the mill, should the strip break. Inertia compensation is made proportional to the rate of change of mill speed by utilizing a voltage derived from the voltage applied to the master rheostat motor, for effecting inertia compensation.

For a more complete understanding of the nature and scope of my invention, reference may be made to the following detailed description, which may be read in connection with the accompanying drawings, in which.

Figure 1:
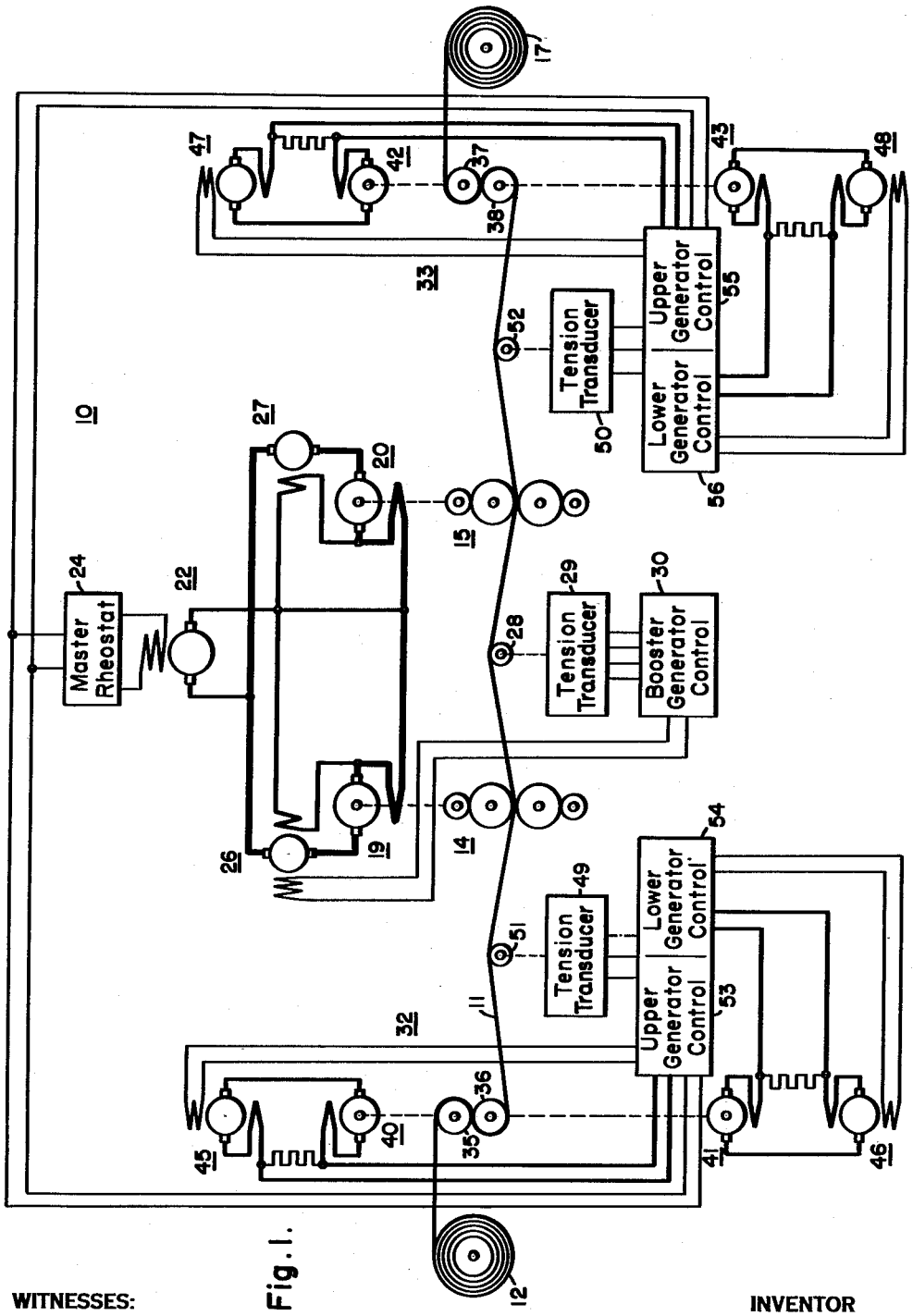
Figure 1 is a schematic diagram of a two-stand temper pass mill embodying the invention in one of its forms.

Referring to Fig. 1 the reference numeral 10 may denote, generally, a control system for a two-stand temper pass mill wherein a strip of steel 11 is disposed to be unwound from an entry reel 12 and pass between the rolls of No. 1 and No. 2 roll stands 14 and 15, respectively, before being wound on a delivery reel device 17.

Referring again to Figure 1, it will be seen that the roll stands 14 and 15 may be provided with individual drive motors 19 and 20 which may be supplied with electrical energy from a common main generator 22, the output voltage of which may be controlled by a master rheostat represented, generally, by the enclosure 24. The voltages applied to each of the mill motors may be controlled by means of booster generators 26 and 27 individual to the motors 19 and 20, respectively. A tension responsive device or tensiometer 28 may be disposed between the two mill stands for controlling the voltage applied to the motor 19 through a tension transducer and a booster generator control circuit represented by the blocks 29 and 30, respectively.

Between the entry reel device 12 and the stand 14, and between the stand 15 and the delivery reel device 17, tension devices 32 and 33 may be disposed for controlling the tension of the strip 11. The tension devices 32 and 33 may comprise upper and lower tension rolls 35, 36 and 37, 38 provided with individual motors 40, 41 and 42, 43 each with its individual principal generator 45, 46 and 47, 48, respectively. Tension transducers 49 and 50 may be disposed in connection with tensiometers 51 and 52 between the tension devices and the adjacent mill stands for controlling the operation of the tension devices through upper and lower generator control circuits 53, 54 and 55, 56, respectively.

Figure 3:
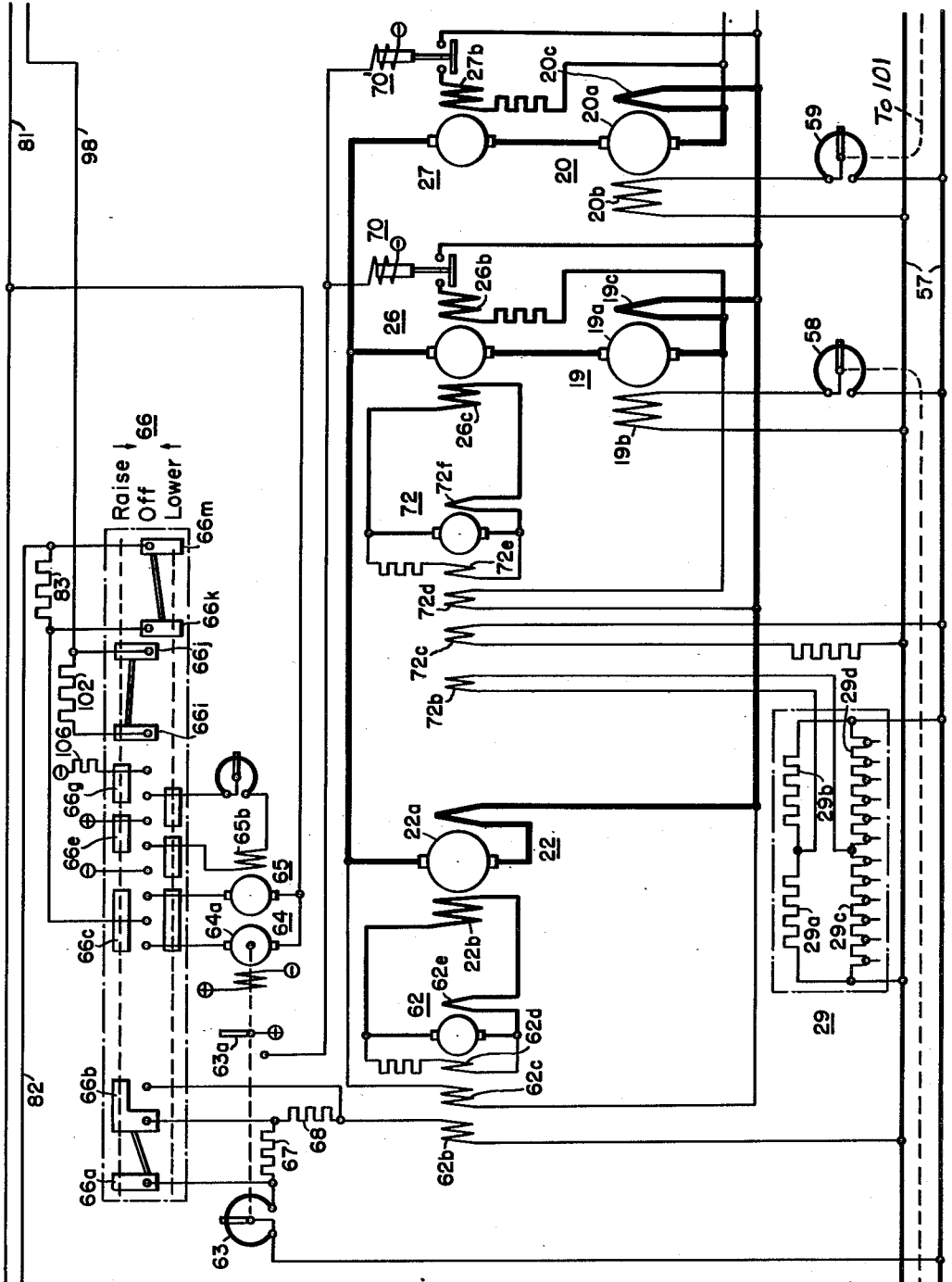
Fig. 3 is a diagrammatic view of the control system for the two stands of the mill including the tension control system for the booster generator of the No. 1 stand.

Referring to Figure 3, it will be seen that the motors 19 and 20 may be provided with main field windings $19b$ and $20b$, which may be connected to a suitable source of control potential of substantially constant voltage, represented by the conductors 57, through mill stand field rheostats 58 and 59, respectively. Series field windings 19c and 20c may be connected in series circuit relation with the armatures 19a and 20a of the motors for providing suitable compounding effects.

The armatures 19a and 20a may be connected in circuit relation with the armature 22a of the main generator 22, which may be provided with a main field winding 22b. Energization of the main field winding may be provided from an exciter 62 of the regulating generator type, having a pattern field winding 62b, a control field winding 62c, an anti-hunt field winding 62d and a self-energizing type of field winding 62e. The pattern field winding 62b may be energized from the control bus conductors 57 through a master rheostat 63 which may be operatively connected to a rheostat motor 64. Operation of the rheostat motor 64 may be provided by connecting the armature 64a thereof to a rheostat motor generator 65, the field winding 65b of which may be selectively energized in opposite senses through a control switch 66, which may be operated to raise or lower the voltage of the generator 22, and hence the speed of the mill.

In order to compensate for the time constants of the machines in accelerating and decelerating, control means may be provided for forcing changes of generator voltage by initially increasing the energization of the field winding 62b when the speed of the mill is being raised and for initially reducing it whenever the speed of the mill is being lowered, to compensate for the time lag of the current in the generator field winding 22b, with respect to the voltage of the exciter 62, so as to in effect anticipate operation of the master rheostat 63. For example, a resistor 67 may be connected in circuit relation with the field winding 62b and disposed to be normally shunted through contact members 66a and 66b of the control switch 66. Operation of the control switch to lower the speed of the mill removes the shunt connections from the resistor 67 and thus immediately weakens the pattern field so as to reduce the output voltage of the mill generator 22 almost as soon as the master rheostat 63 is operated to do so. A resistor 68 normally connected in series circuit relation with the field winding 62b may be shunted with contact members 66b whenever the control switch 66 is operated to raise the speed of the mill, thereby immediately increasing the strength of the pattern field.

The booster generator 27 of the mill motor 20 may be provided with a field winding 27b disposed to be connected for energization in accordance with the armature current of its associated motor so as to provide IR drop compensation for the motor. In order to provide this compensation in the lower speed range of the motor only, means such as the control relay 70' may be provided for connecting the field winding 27b across the series field winding 20c through a switch 63a, which may be disposed in circuit making relation only when the master rheostat 63 is operated to a relatively low voltage operating position, such as when the mill is being operated at threading speed.

The motor 19 of the first mill stand is provided with a booster generator 26, having field windings 26b and 26c. The field winding 26b may likewise be controlled by a relay 70 energized through the control switch 63a. The field winding 26c may be supplied with electrical energy from a regulating generator 72 having a pattern field winding 72b, a bias field winding 72c, a current field winding 72d, an anti-hunt field winding 72e, and a self-energizing type of field winding 72f. The pattern field winding may be connected to the control bus conductors 57, through a bridge circuit tension transducer 29, comprising a plurality of resistors 29a, 29b, 29c and 29d connected in bridge circuit relation, with the resistors 29c and 29d disposed to be sequentially shunted through operation of the tension device 28, which may be actuated by the strip 11. The energization of the pattern field winding 72b may thus be varied so as to determine the output voltage of the regulating generator 72 and regulate the operation of the mill motor 19 to maintain a predetermined strip tension between the two mill stands. The bias field winding 72c may be connected to the control conductors 57 so as to oppose the action of the current field winding 72d, which may be energized in accordance with the armature current of the motor 19 and acts primarily as a stabilizing field winding.

Figure 2:
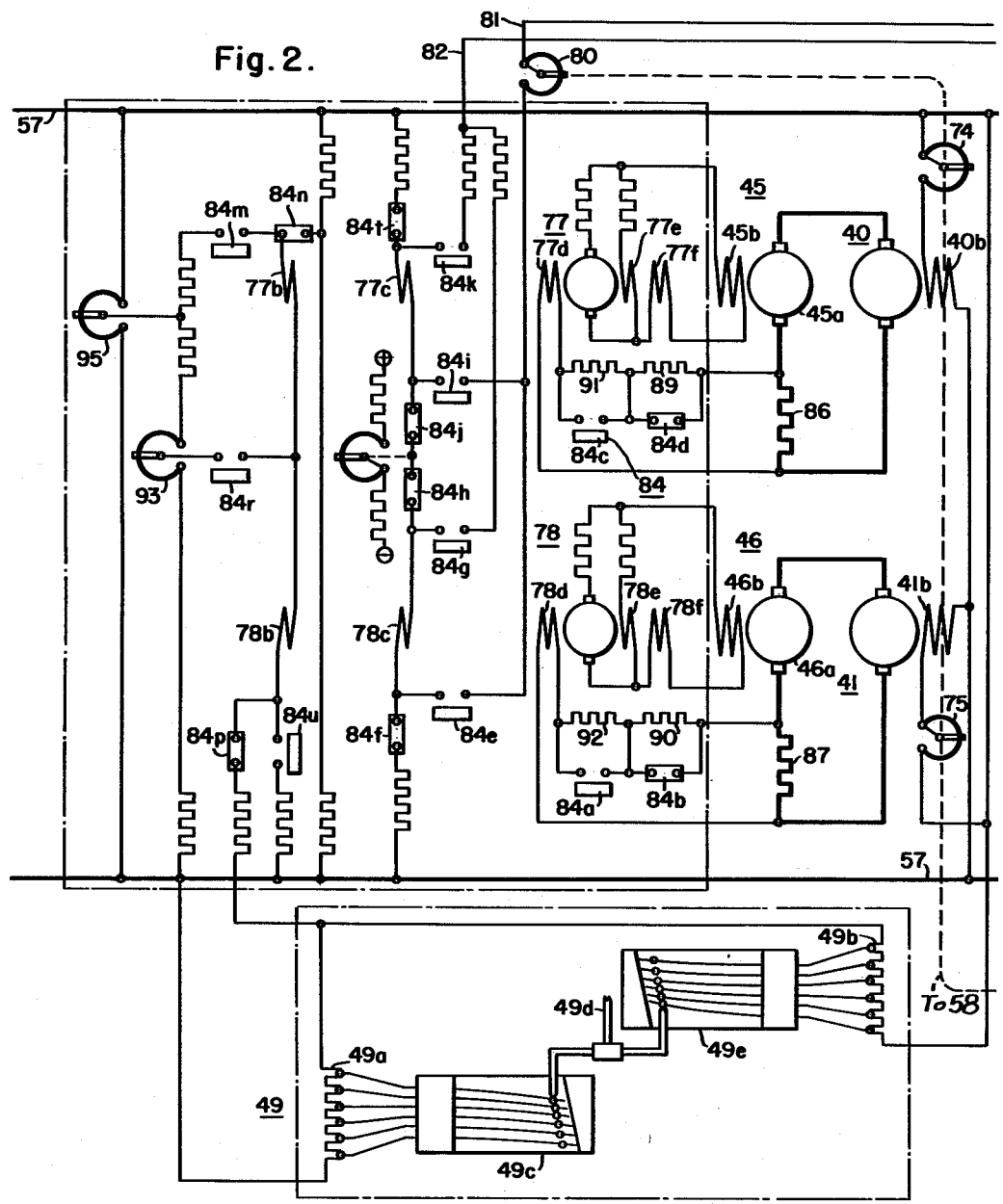
Fig. 2 is a diagrammatic view of the control for the entry end tension device.

Referring to Figure 2 it will be seen that the motors 40 and 41 may be provided with main field windings 40b and 41b disposed to be energized from the conductors 57 through field rheostats 74 and 75, which may be operatively connected to the field rheostat 58 of the motor 19 of the first mill stand. The generators 45 and 46 of the motors 40 and 41 may be provided with regulating generators 77 and 78 for controlling the energization of their respective field windings 45b and 46b. The regulating generators 77 and 78 may be provided with pattern field windings 77b and 78b, inertia compensation field windings 77c and 78c, current field windings 77d and 78d, anti-hunt field windings 77e and 78e, and self-energizing field windings 77f and 78f, respectively. The anti-hunt field windings may be connected across the armatures of their respective regulating generators, while the self-energizing field windings 77f and 78f may be connected in series circuit relation with their respective armatures. The current field windings 77d and 78d may be connected for energization in accordance with the armature current of their respective generators 45 and 46.

The inertia compensation field windings 77c and 78c may be disposed to be energized in accordance with the rate of change of speed of the mill, being, for example, connected through a field rheostat 80 mechanically coupled to the rheostats 74, 75 and 58, to inertia compensation bus conductors 81 and 82. These conductors may, as shown in Figure 3, be connected across the armature of the rheostat motor 64 so as to be energized in accordance with the voltage applied to the rheostat motor, which will be generally proportional to the speed of the motor, and hence the rate of change of speed of the mill. In order to effect inertia compensation of the entry and delivery end of the mill in different degrees in accordance with whether the mill is accelerating or decelerating, the inertia compensation conductor 82 may be normally connected to the rheostat motor 64 through contact members 66k and 66m of the control switch 66 which may be disposed to shunt a resistor 83, except when the speed of the mill is being raised.

Figure 5:
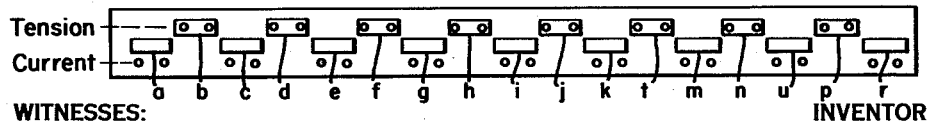
Fig. 5 illustrates a development in the contact segments on the transfer switch used in connection with the control system of Figs. 2 and 4.

The pattern field windings 77b and 78b may be selectively connected either to the constant potential bus conductors 57 through the tension transducer 49 for controlling the tension of the strip in accordance with the operation of the tension device or they may be connected to the conductors 57 with a view to effecting relative current regulation of the motors 40 and 41. As shown in Fig. 2, the transducer 49 may comprise resistance units 49a and 49b disposed to be shunted by flexible contact elements 49c and 49e, which may be actuated by a movable member 49d in response to movement of the tensiometer 51. For effecting a transfer between tension regulation and current regulation, a transfer switch 84 may be provided, the development of which is clearly shown in Figure 5. In order to provide this transfer contact members 84c and 84a may be provided for connecting the current field windings 77d and 78d across resistors 86 and 87 in series circuit relation with the armatures 45a and 46a through control resistors 89 and 90, respectively, when current regulation is desired. Contact members 84d and 84b connect the current field windings across the resistors 86 and 87 through resistors 91 and 92 to reduce the effectiveness of these windings when tension control is desired. Contact members 84g, 84e, 84i and 84k may be provided for connecting the inertia compensation field windings 77c and 78c to the inertia compensation bus conductors 81 and 82 during current regulation, and contact members 84f, 84h, 84i and 84t may be provided for connecting them to the conductors 57 during tension regulation. Contact members 84m, 84n and 84u may be provided for connecting the pattern field winding 77b and 78b to the conductors 57 through a running tension rheostat 95 in conjunction with a common load balancing potentiometer 93 during current regulation. Contact members 84n and 84p may be provided for connecting the pattern field windings to the tension regulator 49 during tension regulation.

Figure 4:
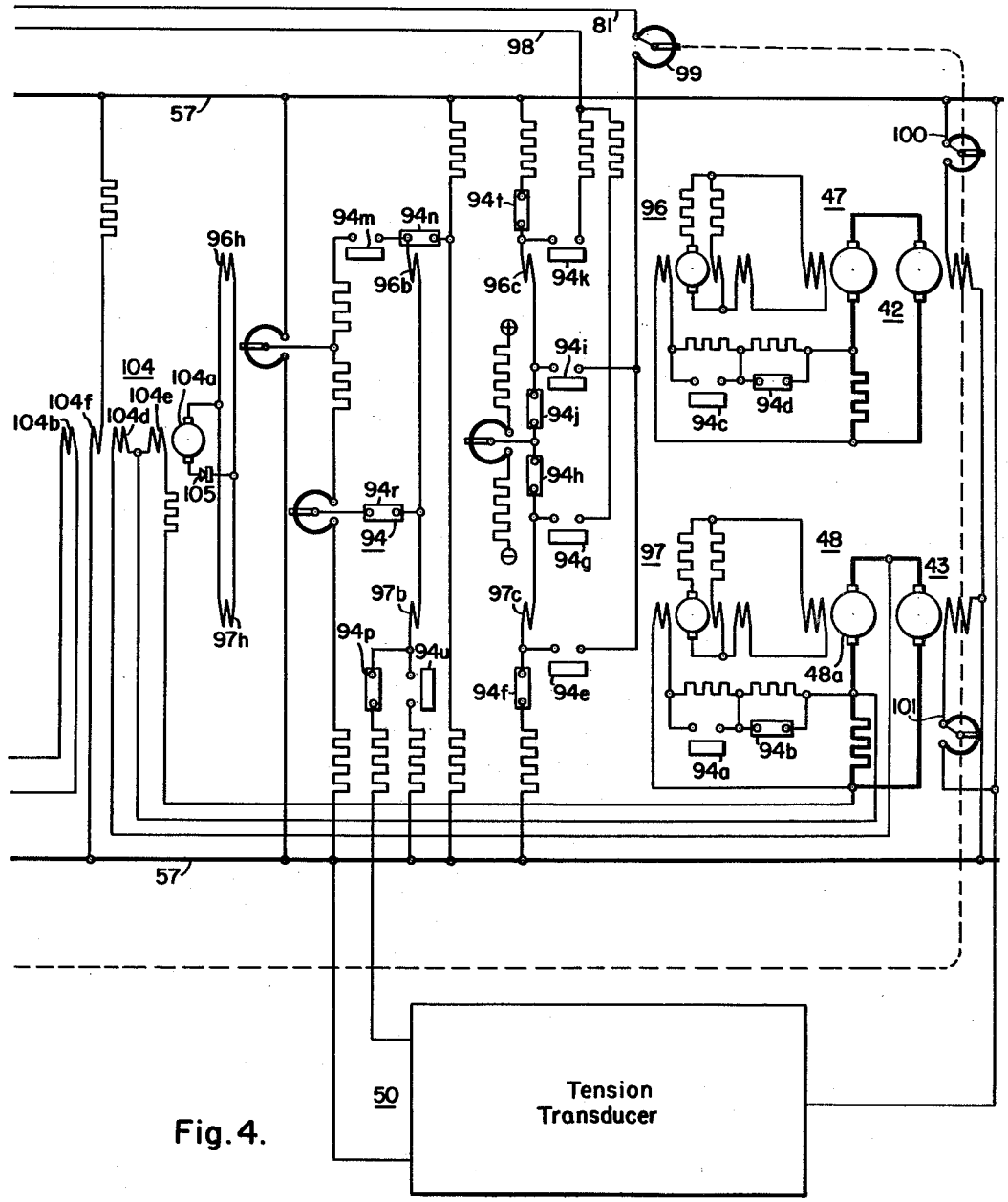
Figure 4 is a diagrammatic view of the control system for the delivery end tension device.

Referring to Figure 4 it will be seen that the motors 42 and 43 of the delivery tension device may be energized from their associated generators 47 and 48 under the control of regulating generators 96 and 97. The operation of the regulating generators 96 and 97 may be selectively determined by the tension transducer 50 or in accordance with the armature current of the motors 42 and 43 in a manner substantially identical with that described in detail in connection with the foregoing description applied to Figure 2 of the drawings. The inertia compensation field windings 96c and 97c may be connected to inertia compensation conductors 81 and 98 through a rheostat 99 which may be operatively connected to the rheostat 59 of the No. 2 stand of the mill, as also are the field rheostats 100 and 101 of the motors 42 and 43. The inertia compensation bus conductor 98 may be connected through a control resistor 102 to the rheostat motor 64. The resistor 102 may be normally shunted by contact members 66i and 66j of the control switch 66 being connected into circuit relation with the conductor 98 when the control switch is operated to lower the speed of the mill. The pattern field windings 96b and 97b may be connected through the contacts of a transfer switch 94 having contact members 94a through 94r corresponding to those of the switch 84 of Figure 2, which may be used to transfer the tension device 33 from current to tension regulation.

In order to limit the speed of the tension device 33 should the strip break, means such as the speed limiting regulating generator 104 may be provided. The regulating generator 104 may comprise an armature 104a disposed to be connected in circuit relation with speed limiting field windings 96h and 97h on the regulating generators 96 and 97 through a rectifier device 105. The rectifier device may be so disposed that the regulating generator 104 can only energize the field windings 96h and 97h in such a direction as to reduce the voltage applied to the motors 42 and 43. The regulating generator 104 may be provided with a pattern field winding 104b disposed to be connected across the armature of the motor 20 to serve as an indication of the speed of the mill. A voltage field winding 104d may be connected across the armature 48a to serve with IR field winding 104e as a speed indication of the tension device 33. A bias field winding 104f may be connected to the bus conductors 57 so as to provide a blocking voltage for rendering the speed limiting regulation generator effective only when a predetermined speed regulation with the mill is exceeded.

In operation, with the transfer switch 84 and its counterpart in Figure 4 positioned as shown the regulating generators 77, 78, 96 and 97 will be connected for regulating the tension devices 32 and 33 in accordance with the tension of the strip 11 as measured by the tensiometers 51 and 52. For example, should the tension of the strip 11 between the entry tension device 32 and the entry stand 14 increase, the tensiometer 51 operates the tension transducer 49 so as to produce an unbalance in the bridge circuit of the tension transducer 49 in such a direction as to increase the energization of the pattern field windings 77b and 78b which are connected across the bridge circuit of the transducer device through contact members 84n and 84p. This increases the output voltage of the regulating generators 77 and 78 so as to increase the voltage of the generators 45 and 46 and hence increase the speed of the motors 40 and 41 relative to the speed of the entry stand, thus reducing the tension of the strip. The reel device 12 may be provided with a tension regulating system of a type well known in the art which will respond to a change in the speed of the motors driving the tension device 32 and hence regulate the tension of the strip between the reel device and the tension device.

Should the tension of the strip between the stands 14 and 15 change, the tension device 28 operates to unbalance the bridge circuit of the booster generator control circuit, thus varying the energization of the pattern field winding 72b so as to increase the voltage applied to the motor 19 thus restoring normal tension. Under these conditions the tension transducer 49 operates to change the speeds of the motors 40 and 41 to correct any increase in tension which may occur between the tension device 32 and the stand 14 as a result of a change in speed of the motor 19. The tension device 33 operates through the transducer 50 to regulate the strip tension on the delivery end of the mill.

Whenever the speed of the mill is raised, operation of the control switch 66 connects the rheostat motor 64 to the rheostat motor generator 65 through contact member 66c. The field winding 65b of the rheostat motor generator will be connected to a source of electrical energy through contact members 66e and 66g, thus connecting resistor 106 in circuit relation therewith so as to effect reduced energization of the field winding. At the same time contact member 66b shunts resistor 68 in circuit with the field circuit 62b of the regulating generator 62, thus anticipating operation of the master rheostat 63, and immediately increasing the energization of the pattern field winding 62b so as to increase the voltage of the mill generator 22 at an advanced rate and compensate for the time constants of the generator 22 and motors 19 and 20. At the same time contact members 66k and 66m operate to remove the shunt from control resistor 83. However, the inertia compensation field windings 77c and 78c of the entry tension device are disconnected from the inertia compensation bus conductors 81 and 82 by contact members 84e of the transfer switch 84.

Should it be desired to regulate the tension of the strip 11 by current regulation the transfer switches 84 and 94 may be operated to the current regulating position. In this position the pattern field windings 77b and 78b of Figure 2 and 96b and 97b of Figure 4 will be connected to the control bus conductors 57 to determine the current for which the regulating generators will regulate. The current field windings will be connected for energization in accordance with the armature currents of their respective generators so as to regulate the respective motors, and the inertia compensation field windings of the regulating generators will be connected to the inertia compensation bus conductors 81 and 82. Under these conditions the regulating generators function to maintain predetermined values of armature currents for the motors 40, 41, 42 and 43.

From the above description and the accompanying drawings it will be apparent that I have provided in a simple and effective manner for regulating the tension of a strip. Regulations of strip tension may be effected in accordance with predetermined values of armature current or in accordance with the strip tension as measured by tensiometer devices. The change from one to the other may be effected through the operation of a simple transfer switch thus providing a highly flexible control system.

Since certain changes may be made in the above-described construction and different embodiments of the invention may be made without departing from the spirit and scope thereof it is intended that all the matter contained in the above description and shown in the accompanying drawings shall be considered as illustrative and not in a limiting sense.

I claim as my invention:

1. In a control system for a tension device having a pair of rolls about and between which a strip of material is disposed to pass, a dynamo electric machine connected in driving relation with each of the rolls, a principal generator individual to each dynamo electric machine, a regulating generator individual to each principal generator, each of said regulating generators having a plurality of field windings including current and pattern field windings, and circuit means including a manual transfer switch connected in one position to effect limited energization of the current field windings in accordance with the armature current of its associated principal generator and effect energization of the pattern field windings in accordance with the tension of the strip, said switch being operable to another position to connect the pattern field windings to a source of control voltage and increase the energization of the current field winding in accordance with the current.

2. In a tension control system for use with a mill having a roll stand handling a strip material, a motor connected in driving relation with the roll stand, a main generator connected to supply electrical energy to said motor, means including a regulating generator having a pattern field winding and an opposing control field winding connected to be energized in accordance with the generator voltage to determine the output voltage of the generator, rheostat means connecting the pattern field winding to a source of excitation, a rheostat motor operable to actuate the rheostat, control means including a switch operable to effect operation of the rheostat motor to raise and lower the voltage of the generator, resistance means disposed to be connected in circuit relation with said rheostat means, and circuit means controlled by said switch connected to change connections of the resistance means to render portions of said resistance means selectively effective and ineffective in accordance with operation of the control means to raise and lower the generator voltage.

3. In a control system for a motor, a main generator connected to supply electrical energy to the motor, a regulating generator connected to supply field excitation for the main generator, said regulating generator having a pattern field winding and a control field winding, a rheostat connecting the pattern field winding to a source of control voltage to determine the voltage of the main generator, said rheostat having switch means with contact means selectively operable to effect operation of the rheostat to vary the output voltage of the generator, circuit means connecting the control field winding to be energized in accordance with the main generator voltage in opposed relation with the pattern field winding, resistance means disposed to be connected in circuit relation with the pattern field winding, and circuit means including contact means of the switch means operable in response to operation of the operating means therefore to change the connections of the resistance means and decrease the effective value of said resistance means when the generator voltage is raised and increase the effective value thereof when the generator voltage is lowered.

4. The combination in a tension control system wherein a strip of material is disposed to be wrapped around and between a pair of rolls of a tension device, of a separate motor connected in driving relation with each roll, generating means individual to each motor including a regulating generator, and circuit means connected to provide field excitation for both of the regulating generators including a common load balance potentiometer connected to vary the field excitation of said regulating generators in opposite senses.

5. In a tension control system for a strip of material disposed to pass around and between rolls of a tension device, a dynamo electric machine connected in driving relation with each roll, circuit means connected in electrical energy transferring relation with the dynamo electric machines including a regulating generator individual to each machine, each of said generators having opposing current and output controlling pattern field windings, and switch means operable to selectively energize said pattern field windings in accordance with an adjustable reference voltage and the tension of said strip of material.

6. In a control system for a tandem mill having a pair of stands with driving motors energized from a main generator, control means operable to raise and lower the output voltage of the main generator, tension means on the entry and delivery sides of the mill including tension rolls having driving motors with generating means controlling the energization thereof, impedance means of different values associated with said generating means, and circuit means including contact means operable in response to operation of the control means to connect said different impedance means to alter the energization of the motors of the entry and delivery tension devices in different degrees while the speed of the mill is being changed.

7. In a tension control system for a roll stand and a reel device disposed to handle a strip material and having a tension device disposed to be positioned between the reel device and the stand with a pair of rolls engaging the strip, a driving motor for each of the rolls of the tension device, and a tensiometer disposed between the tension device and the roll stand connected to regulate energization of the motors of the tension device.

8. The combination in a tandem mill having a pair of roll stands with electric motors supplied from a common main generator, of a pair of tension devices disposed one on the entry side and one on the delivery side of the mill, each of said tension devices having a pair of rolls about which the strip is disposed to be wrapped, a motor connected in driving relation with each roll, generating means individual to each motor including a regulating generator having a pattern field winding and an opposing current winding disposed to be energized in accordance with the armature currents of their respective motors, and circuit means including a common load balancing potentiometer associated with each tension device connected to vary the energization of the pattern field windings for the regulating generators of said tension device in opposite senses.

9. In a control system, a motor connected in driving relation with a work device for a strip of material, a tension device having a pair of tension rolls around which and between which the strip is disposed to pass, a motor connected in driving relation with each of said tension rolls having an armature and a field winding, control means operable to vary field excitation of the work device and tension device motors simultaneously, generating means connected to supply electrical energy to the armatures of the tension device motors including regulating means for each of said tension device motors, each of said regulating means having a plurality of control windings, and a speed limit regulating generator connected in circuit relation with one control winding of each of said regulating means, said speed limit regulating generator having opposed field windings disposed to be energized in accordance with the armature voltage of the work device motor and the armature voltage of one of the tension device motors.

10. In a control system for a tandem mill having a pair of stands, a motor connected in driving relation with each stand, a common main generator connected to supply electrical energy to said motors, circuit means disposed to control the output voltage of the main generator including a rheostat operated by a motor, control means operable to effect reversible operation of the rheostat motor, rheostat means operable to vary the field excitation of each of the motors, a tension device disposed on the entry side and the delivery side of the mill, each of said devices having a motor connected to vary the load on the work device motor, and circuit means including rheostat means operatively connected with the motor field rheostat of each stand motor connected to produce control voltages for modifying the operations of the work device motors when the rheostat motor is operated to accelerate or decelerate the mill.

11. The combination with a motor connected in driving relation with a work device, of tension devices disposed on the entry and delivery sides of the work device having driving motors connected in driving relation therewith for controlling the load on the work device, generating means connected to supply electrical energy to the motor of the work device, rheostat means connected to vary the voltage of the generating means, a rheostat motor connected in driving relation with the rheostat, a rheostat generator connected to supply electrical energy to the rheostat motor, control means operable to effect energization of the rheostat motor from the rheostat generator in opposite senses, additional generating means connected to supply electrical energy to the motors of the tension devices to regulate the armature currents of the respective motors, resistance means of different values, and circuit means including contact means operable in response to operation of the control means to connect said resistance means of different values in output controlling circuit relation with said additional generating means of the entry and delivery tension devices respectively.

References Cited in the file of this patent

UNITED STATES PATENTS

| | | |
|---|---|---|
| 1,979,102 | Eaton | Oct. 30, 1934 |
| 2,462,233 | Stoltz | Feb. 22, 1949 |
| 2,484,825 | Harris | Oct. 18, 1949 |
| 2,492,022 | Weybrew et al. | Dec. 20, 1949 |
| 2,496,881 | Livingston | Feb. 7, 1950 |
| 2,508,153 | Frisch et al. | May 16, 1950 |
| 2,519,339 | Avery | Aug. 22, 1950 |
| 2,590,491 | Bendz | Mar. 25, 1952 |

OTHER REFERENCES

"Controller for Electric Motors," by James and Markle, McGraw-Hill Book Company, 2nd edition, 1952, pages 199–200.